United States Patent [19]

Torrence

[11] Patent Number: 5,159,753
[45] Date of Patent: Nov. 3, 1992

[54] ROLLER SHELF AND METHOD OF MAKING SAME

[75] Inventor: Arthur L. Torrence, Newtown, Conn.

[73] Assignee: Mechtronics Corporation, Stamford, Conn.

[21] Appl. No.: 658,690

[22] Filed: Feb. 21, 1991

[51] Int. Cl.$^5$ .............................................. B65G 13/00
[52] U.S. Cl. .................................. 29/895.22; 29/418; 29/434
[58] Field of Search ................... 29/895, 895.2, 895.22, 29/418, 434, 437, 441.1, 527.1; 193/35 R, 37; 264/238, 152, 161

[56] References Cited

U.S. PATENT DOCUMENTS

| | | | |
|---|---|---|---|
| 1,611,567 | 12/1926 | Sonen | 29/434 X |
| 2,510,091 | 6/1950 | Dofsen et al. | 264/161 |
| 3,509,978 | 5/1970 | Bedford | 193/35 R |
| 3,840,102 | 10/1974 | Dawson | 193/35 R |
| 4,067,428 | 1/1978 | Shuttleworth | 193/35 R |
| 4,127,924 | 12/1978 | Ross | 29/418 X |
| 4,681,203 | 7/1987 | Kornylak | 193/35 R |

FOREIGN PATENT DOCUMENTS 2844229  4/1980  Fed. Rep. of Germany ........ 193/37

Primary Examiner—Joseph M. Gorski
Attorney, Agent, or Firm—Haynes N. Johnson

[57] ABSTRACT

The method of making a roller shelf for the display and dispensing of wares which includes molding a plurality of groups of molded parallel axles and rollers as a unit and with a common mold runner, the groups each having the same number of axles, providing a pair of side rails having opposed complementary bearing recesses, the number of the bearing recesses being an integral multiple of the number of axles in the groups, simultaneously inserting the axles of a group into the bearing recesses, fixing the axles in the recesses, and breaking off the runner. The roller shelf can have spaced rollers or interleaved and overlapping rollers.

6 Claims, 3 Drawing Sheets

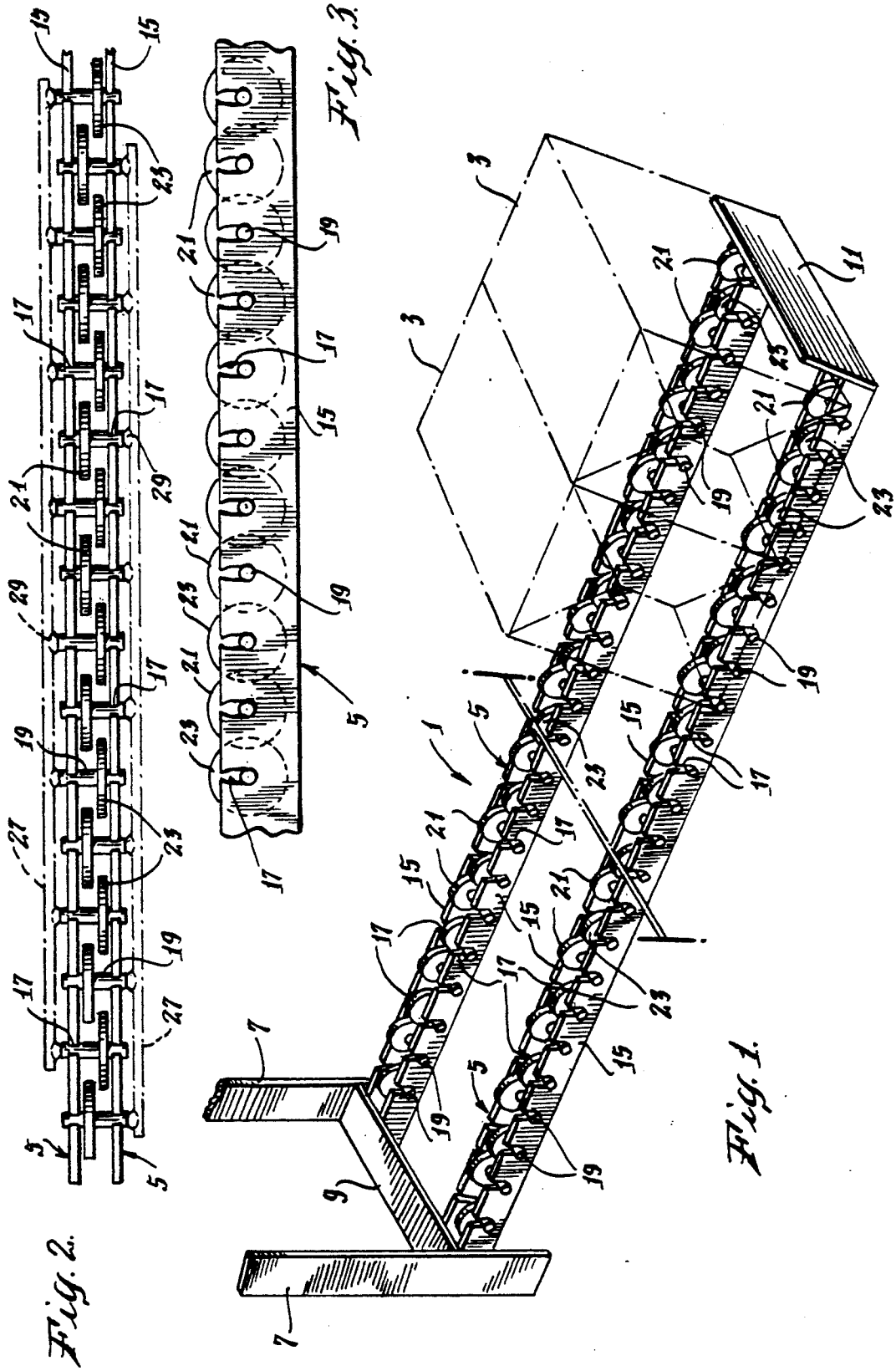

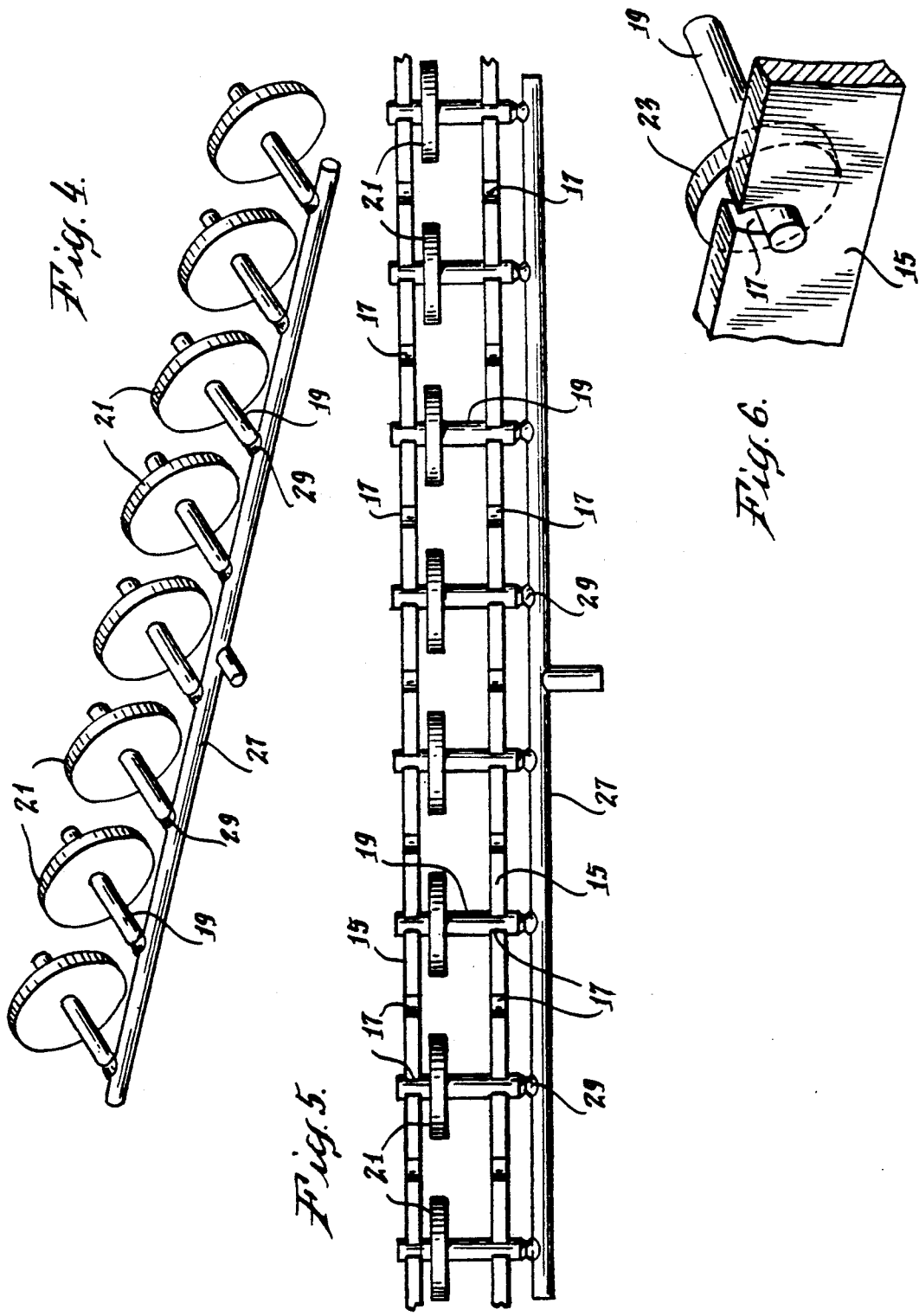

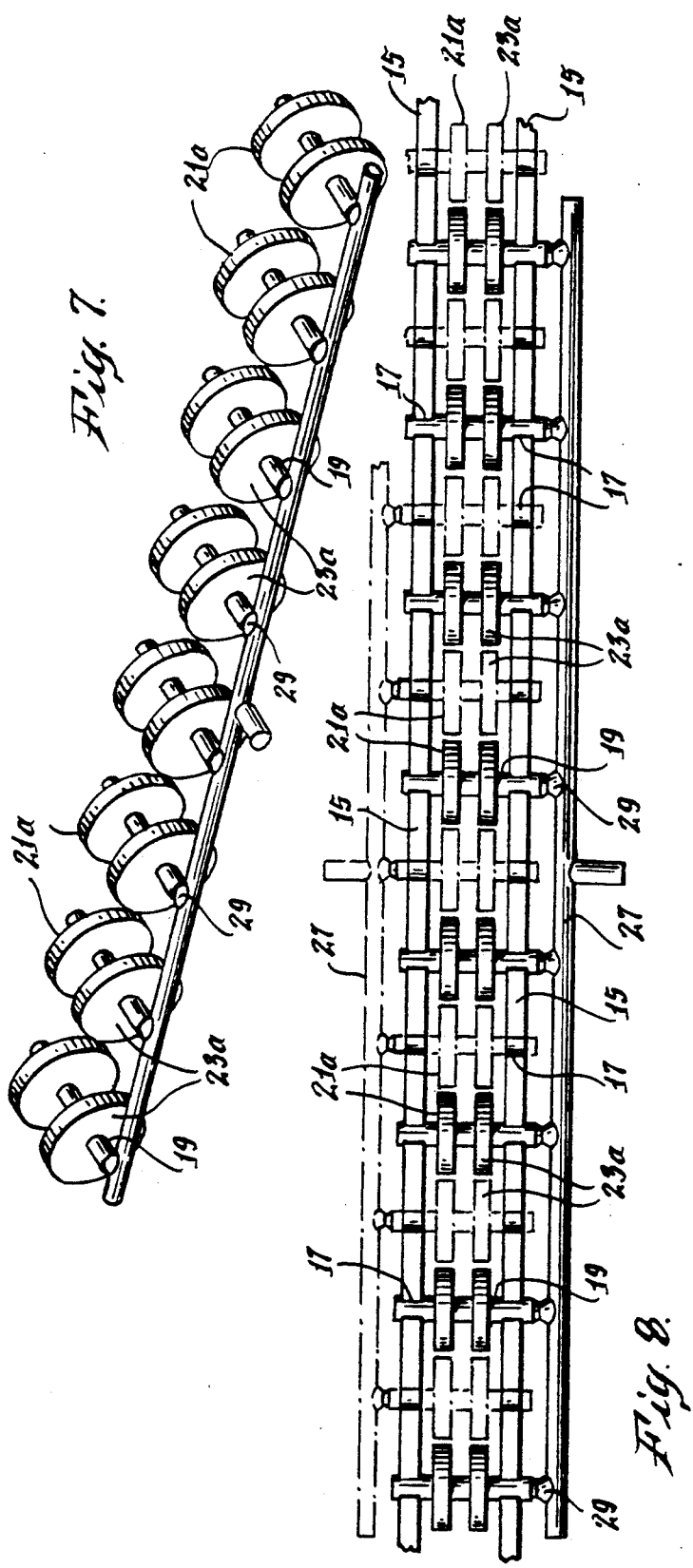

5,159,753

ROLLER SHELF AND METHOD OF MAKING SAME

FIELD OF THE INVENTION

This invention relates to the field of self-dispensing shelves for use in displaying and dispensing products in, say, a supermarket.

BACKGROUND OF THE INVENTION

Self-dispensing shelves of various types have long been used. Normally, they are ones having a smooth, low friction, angled surface on which packages slide. When a customer removes the lowermost package, another package, behind it, slides down to take its place. Such systems are wasteful of space, especially valuable space in freezer compartments, because the shelf must be at a relatively steep angle, such as 20 degrees from the horizontal, in order to work. The use of such a high angle reduces the number of items, such as packages of ice cream, which can be displayed and also means that the package is at an angle when being viewed.

Shelves which have rollers must have ones of small diameter, otherwise the shelf becomes bulky. Yet, the use of small rollers requires many of them and, so, becomes expensive to manufacture.

I have devised a system by which many small rollers can be manufactured and installed as a unit, thus cutting costs.

BRIEF SUMMARY OF THE INVENTION

Two or more roller bars are mounted at an angle of about eight degrees from the horizontal to carry and dispense containers.

The roller bars are made from pairs of rails, having complementary bearing recesses to receive the axles of the rollers, by placing the roller axles into the recesses. The axles are not inserted individually, but in groups. Likewise the axles and rollers are not made individually but are molded in groups, say groups of eight.

The molded axles and rollers are molded on a common runner with the axles all parallel, the axles being necked down where they meet the runner. As a result, an entire group of axles and rollers can be inserted into the recesses of the rails at one time; and, thereafter, the runner is broken off, leaving the entire group of axles and runners in place in the rails.

Preferably, the number of recesses in the rails is an integral multiple of the number of units of axles and rollers molded at one time. Thus, for example, one might mold the axles and rollers in groups of eight and have twenty-four recesses in the rails, thus requiring three molded units to supply all the rollers.

In one form of my invention axles and rollers are interleaved with the rollers partially overlapping.

DESCRIPTION OF THE DRAWINGS

FIG. 1 is a perspective view of a roller shelf made according to my invention. Two cartons of what might be, say, ice cream are shown in phantom.

FIG. 2 is a plan view of a portion of a pair of rails carrying overlapping rollers.

FIG. 3 is a side elevation a portion of the unit of FIG. 2.

FIG. 4 is a perspective view of a group of rollers and axles as they would come out of the mold. The axles are still attached to the runner.

FIG. 5 is a top plan view of the group of FIG. 4 after the axles have been placed in the recesses of the rails, but before the runner has been broken off. It can be seen that eight axles can be placed in eight recesses all at once, not individually.

FIG. 6 is a detail showing an axle within a recess in a rail.

FIG. 7 is a view similar to FIG. 4, but of a modification in which each axle carries two rollers.

FIG. 8 is similar to FIG. 5, but once again showing my modification.

FIG. 9 is a plan view showing a modification in which double rollers are interleaved.

DETAILED DESCRIPTION OF THE INVENTION

An overall view of my roller shelf 1 is seen in FIG. 1. The shelf includes two roller bars 5, upon which two packages 3 (shown in phantom) are resting. The shelf could, of course, be made up of more than two roller bars.

The rear (inner) ends of the roller bars 5 are supported by vertical supports 7 with rear cross member 9 running between them. The bars 5 are secured to cross member 9. The front ends of bars 5 are secured to front cross member 11 which also acts as a stop member for the packages.

The roller bars are at an angle to the horizontal of about eight degrees. This is adequate in most instances to cause containers to move downwardly by gravity.

Each roller bar 5 includes a pair of molded plastic side rails 15 having a series of pairs of matching (opposed) U-shaped recesses 17. Each pair of recesses 17 receives the axle 19 of one roller 21 or 23 and serves as a bearing for it. As can be seen best in FIG. 2, the rollers are interleaved (overlapping) forming two rows made up of right-side rollers 21 and left-side rollers 23. The axles 19 of the right-side rollers 21 pass proximate to and between two left-side rollers 23, and vice-versa. Thus, the rollers form two overlapping rows and are interleaved, providing rollers in two separate vertical planes parallel to the rails.

My design, using many small rollers, results in a thinner roller shelf than one would obtain if large diameter rollers were used. However, using many rollers could result in a high cost for manufacturing all the needed rollers and a high labor cost for installing them. I have overcome this problem by molding the rollers and axles in groups and installing them in groups.

FIG. 4 shows a group of eight axles 19 and rollers 21 which have been molded as a single unit. This same type of group could be used to supply rollers 23. The rollers and axles have all been formed as a unit in the mold on a single runner 27. As can be seen, all eight axles are connected to the runner; and, at the point they are attached to the runner, the gates 29 where they are attached are necked down so they can be easily broken or severed. Each axle, however, remains integral with its respective roller.

The group of axles and rollers is preferably molded of polypropylene or half polypropylene and half styrene (thermoplastic materials). These plastics have a relatively low coefficient of friction and, so, the axles can rotate easily in the bearing recesses 17.

FIG. 5 shows the same group of axles 19 and rollers 21 as in FIG. 4, but, still attached to the runner 27, the axles have been positioned in their respective recessed bearings 17. Thus, in one step all eight axles have been installed. It is thereafter a simple matter to break off runner 27 at the gates 29, and the installation of the right-hand rollers 21 is complete.

One can then take another molded unit of eight axles and rollers and insert it into the rails 15 of FIG. 5 to provide the left-side row of rollers 23. In this instance, the runner 27 would be above the rails 15 as seen in the view of FIG. 5. After this second runner has been broken off, one is left with a set of overlapping and interleaved rollers, eight in each row.

Each axle and its respective roller as made by this method is an integral unit, and the roller does not rotate with respect to the axle.

The upper portion of recesses 17 is sealed by upsetting the plastic through heat, a hot pin, or ultrasonics so as to slightly deform the upper portion of the U-shaped recess to prevent the axle from coming out of it. FIG. 6 shows a single axle sealed within a bearing recess 17.

As can be seen, the manufacturing and installation cost for these rollers and axles has been minimized by molding them and installing them in groups.

Normally one would wish to have more rollers in the finished shelf than the two groups of eight described above. In this instance, one would design the roller shelf to use rollers in integral multiples of eight. For example, the shelf of FIG. 1 could be 16, 32, or 48 rollers in length in each row. Alternatively, one could use a different group size, such as 6, 9, 10, or 12 rollers and axles in the group. Whatever group size is chosen, however, efficiency dictates that the length of the shelf be integral multiples of that group size. If the rollers are interleaved as in FIG. 1, the shelf length should be an integral multiple of twice the group size.

One, of course, need not use overlapping rollers in the roller shelf. FIGS. 7 and 8 show a modification of my invention which includes two rollers 21a and 23a on a common axle 19. In this instance, the rollers and axles are again molded on a common runner 27, and the axles are installed in bearing recesses 17 as before, except that the overlapping feature is omitted. Once installed, the runner 27 is broken off at gates 29. Also, as with the example of FIGS. 4 and 5, the axles and rollers are molded in a predetermined size group and the roller shelf is designed to use a multiple of groups. FIG. 8 shows axles from a given mold in alternate positions, skipping every other pair of recesses. One could, if desired, dimension the molded unit so that the axles fit into adjacent pairs of recesses.

The designs of FIGS. 4 and 5 can be combined with that of FIGS. 7 and 8. Thus, one could use axles bearing two rollers, as in FIG. 7 and, by spacing the rollers on the axle to allow for it, could interleave them as in FIG. 5. This would produce four parallel rows of rollers as shown in FIG. 9. In like manner, more than four rows can also be made.

When the interleaved structure of FIGS. 4 and 5 is used, the spacing of the axles 19 as molded on the runner 27 is twice the spacing of the bearing recesses 17, since, as described above, the axles and rollers are interleaved. With the structure of FIGS. 7 and 8, however, the spacing of the axles on the runner can be the same as the spacing of the bearing recesses, or twice that spacing.

I claim:

1. A method of making a roller self including the steps of:

molding a plurality of groups of parallel roller structures each said roller structure comprising an axle having at least one roller joined integrally therewith, each said group having a common runner interconnecting said parallel roller structures in that said group, said groups each having the same number of said roller structures;

providing a pair of side rails having opposed complementary beating recesses to receive said axles of said roller structures, the number of said bearing recesses being an integral multiple of the number of said roller structures in said groups, simultaneously inserting said axles of said roller structures of a said group into said bearing recesses, and thereafter breaking off said runner, whereby a roller bar is formed of each said pair of side rails and its inserted said roller structures.

2. The method of making a roller shelf as set forth in claim 1 including the step of mounting at least two of said roller bars parallel to one another and at an angle to the horizontal, whereby packages can be displayed and dispensed from said roller bars.

3. The method of making a roller shelf as set forth in claim 2 in which said angle to the horizontal is about eight degrees.

4. The method of making a roller shelf as set forth in claim 1 in which the spacing of said axles of said roller structures longitudinally of said runner is double that of said bearing recesses and said inserting step includes placing said axles in alternate said recesses.

5. The method of making a roller shelf as set forth in claim 4 further including placing said axles of said roller structures of a second group into each recess which does not yet have an axle therein, such that each roller on each said axle overlaps the said rollers on immediately adjacent said axles.

6. The method of making a roller shelf as set forth in claim 1 in which said rollers and said axles are molded of polypropylene.

* * * * *